United States Patent [19]

Ouchi

[11] Patent Number: 4,821,601
[45] Date of Patent: Apr. 18, 1989

[54] DIFFERENTIAL CONTROLLING DEVICE FOR DIFFERENTIAL GEAR

[75] Inventor: Mitsuyuki Ouchi, Susono, Japan

[73] Assignee: Toyota Jidosha Kabushiki Kaisha, Toyota, Japan

[21] Appl. No.: 81,727

[22] Filed: Aug. 5, 1987

[30] Foreign Application Priority Data

Aug. 5, 1986 [JP] Japan .................. 119409[U]

[51] Int. Cl.$^4$ .............................................. F16H 1/44
[52] U.S. Cl. ........................................ 74/71; 74/710.5
[58] Field of Search .............................. 74/710.5, 711

[56] References Cited

U.S. PATENT DOCUMENTS

| | | | |
|---|---|---|---|
| 2,876,658 | 3/1959 | McColl | 74/710.5 |
| 2,934,975 | 5/1960 | Algie | 74/710.5 X |
| 4,156,547 | 5/1979 | Marsh | 74/711 X |
| 4,549,448 | 10/1985 | Kittle | 74/710.5 |

FOREIGN PATENT DOCUMENTS

| | | |
|---|---|---|
| 55-40454 | 10/1980 | Japan . |
| 59-150630 | 10/1984 | Japan . |
| 59-158745 | 10/1984 | Japan . |
| 0191430 | 8/1986 | Japan .................. 74/711 |
| 1115928 | 9/1984 | U.S.S.R. .............. 74/711 |

Primary Examiner—Dirk Wright
Assistant Examiner—Harold F. Macris
Attorney, Agent, or Firm—Oblon, Fisher, Spivak, McClelland & Maier

[57] ABSTRACT

A differential gear includes a differential case having a plurality of recesses provided circumferentially at equal intervals, a plurality of pinions and a pair of side gears respectively disposed in the differential case, shafts connected to the respective side gears and a sleeve supported by one shaft shiftably in an axial direction thereof and unrotatably relative thereto and having a plurality of claws capable of fitting in the recesses. A controlling device includes a cylinder unit for operating the sleeve, a pressure sensor for detecting the braking condition of a vehicle, a sensor for detecting a steering angle and a controller for receiving signals from both sensors and controlling the cylinder unit to limit the rotational speed differential generated from the the differential gear when the vehicle is braked and turned with a steering angle exceeding a predetermined value.

7 Claims, 3 Drawing Sheets

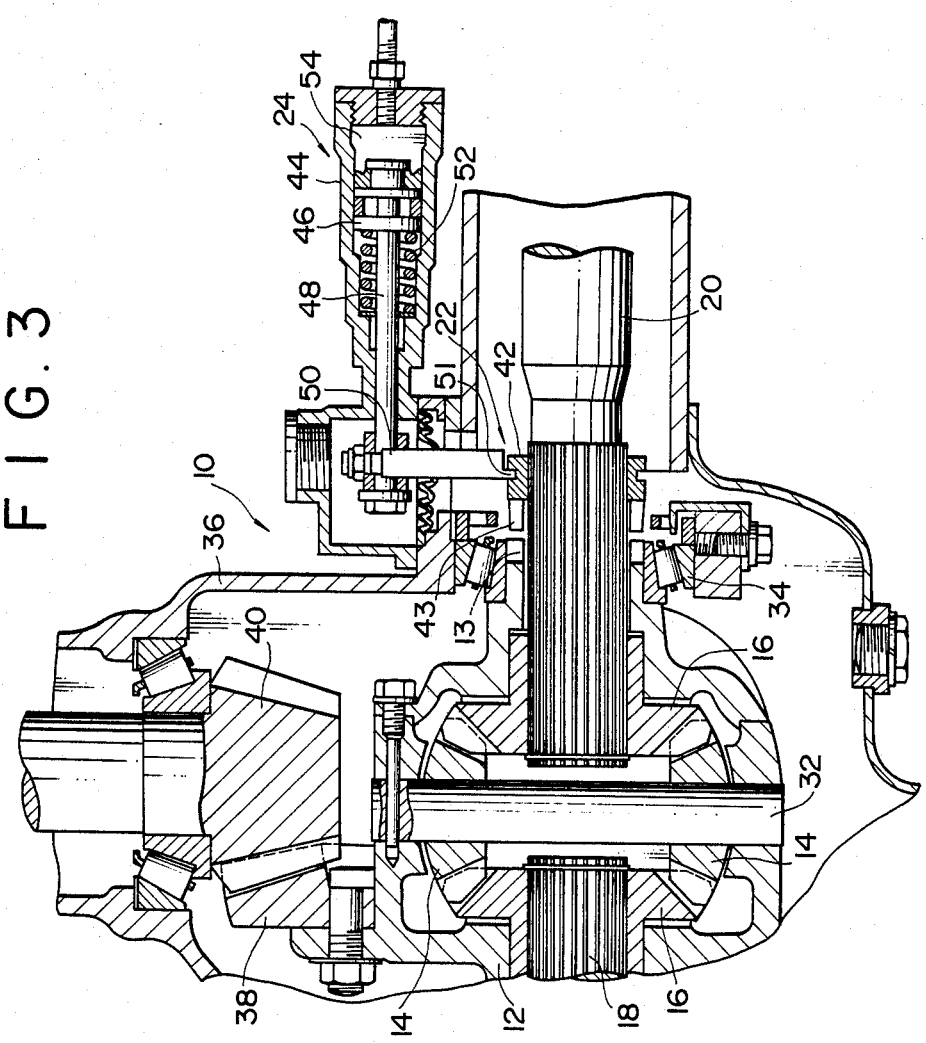

DIFFERENTIAL CONTROLLING DEVICE FOR DIFFERENTIAL GEAR

BACKGROUND OF THE INVENTION

1. Field of the Invention

This invention relates to a differential controlling device for a differential gear and, more particularly, to a device for controlling the rotational speed differential, which is generated to shafts respectively connected to a pair of side gears in cooperation with a differential case, a plurality of pinions and the pair of side gears respectively disposed in the differential case, in a differential gear capable of being limited by limiting means.

2. Description of the Prior Art

Various devices for controlling the rotational speed differential of output shafts of a differential gear have been proposed.

The Japanese Patent Publication No. 40454/80 has disclosed a differential controlling device, in which a clutch member is swung by pedalling a brake pedal to press a side gear against a differential case for limiting the rotational speed differential.

The Japanese Utility Model Public Disclosure (KOKAI) No. 150630/84 has disclosed a differential controlling device for a vehicle, in which after a steering angle of the vehicle is detected and a detected value is conducted to a comparator, a control circuit is operated to limit the rotational differential according to the steering angle.

The Japanese Utility Model Public Disclosure (KOKAI) No. 158745/84 has disclosed a differential gear with a differential lock, in which, the differential lock is released to permit a rotational speed differential when vehicle speed exceeds a predetermined value.

Either of types of the devices noted above cannot solve any problem caused by braking when left and right wheels travel on road surfaces having different coefficients of friction, i.e., a so called frictionally different road.

When the rotational speed differential is controlled during the braking of the vehicle travelling on the frictionally different road to obviate the rotational difference between left and right wheels at the time of straight travelling and braking, the slip ratios of left and right wheels are equalized with each other to make a difference in braking forces. Thus, since the vehicle deviates to effect an unstable behavior, it is not preferable to limit the rotational speed differential when braking during in straight advance travelling on the frictionally different road. On the other hand, in case when turning the vehicle on the frictionally different road, swinging of a rear vehicle portion due to early wheel resulting from lead shifting lock of an inside wheel and an unstable behavior due to the reduction of braking forces are more unfavorable than the deviation of the vehicle due to the difference in the braking forces. Therefore, it is more preferable to limit the differential in this case.

SUMMARY OF THE INVENTION

An object of the present invention is to provide a differential controlling device for a differential gear which can cope with the unstable behavior of a vehicle in straight travelling and turning travelling on roads including frictionally different roads.

According to the present invention, there is provided a device for controlling the rotational differential, which is generated to shafts respectively connected to a pair of side gears in cooperation with a differential case, a plurality of pinions and the pair of side gears respectively disposed in the differential case, in a differential gear capable of being limited by limiting means, said device comprising means for operating said limiting means, a sensor for detecting braking condition of a vehicle, a sensor for detecting a steering angle and a controller for receiving signals from both sensors, wherein said controller controls said operating means to limit the differential when the vehicle is braked and turned with a steering angle exceeding a predetermined value.

Even if the vehicle is braked in straight travelling, the controller does not operate the operating means, and the limiting means does not limit the rotational speed differential, since the controller does not receive an output of the steering angle sensor.

When the vehicle is braked during turning with the steering angle exceeding a predetermined value, the controller operates the operating means to engage the limiting means, thereby limiting the speed differential.

Since, in straight travelling and braking or turning with a small steering angle, the differential is permitted, the unstable behavior based on the difference between the braking forces of left and right wheels travelling on the frictionally different road may be prevented.

Since the differential is limited at the time of braking the vehicle turned with a steering angle exceeding a predetermined value, the inside wheel may be prevented from early wheel locking through shifting of load due to the turning. Therefore, the vehicle may be restrained from the unstable behavior.

BRIEF DESCRIPTION OF THE DRAWINGS

The foregoing and other objects and features of the invention will become apparent from the following description of a preferred embodiment of the invention with reference of the accompanying drawings, in which:

FIG. 3 is a sectional view showing a differential gear and operating means.

DETAILED DESCRIPTION OF THE PREFERRED EMBODIMENT

Figure 1:
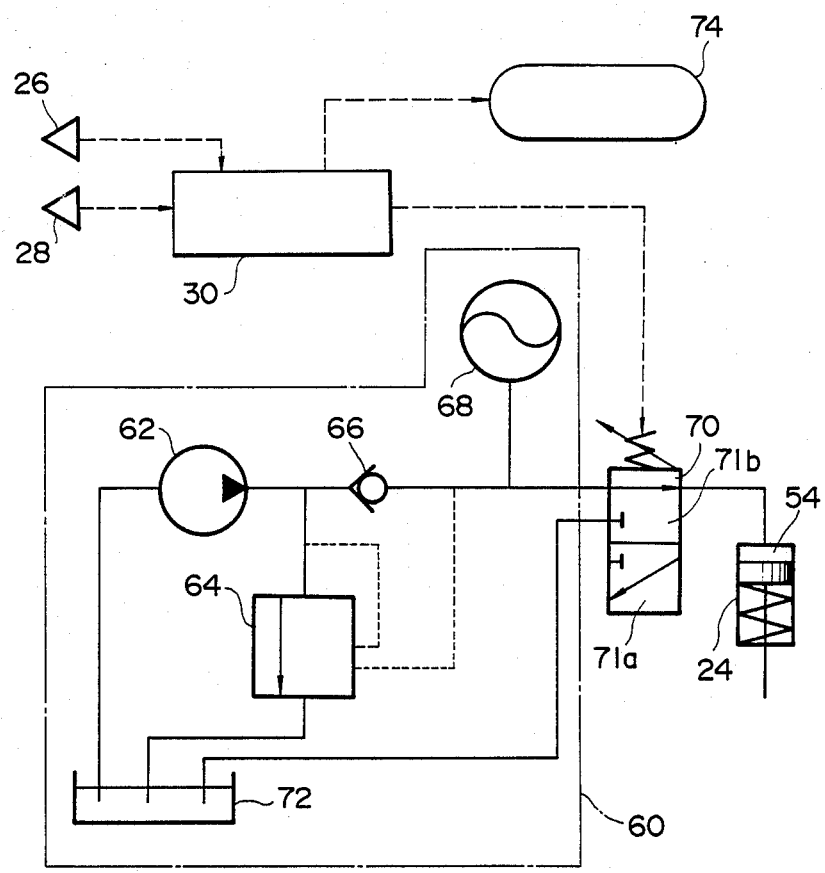
FIG. 1 is a block diagram showing a differential controlling device.

As shown in FIG. 3, a differential gear 10 permits limiting with limiting means 22 the rotational speed differential which is generated to shafts 18,20 respectively connected to a pair of side gears 16 in cooperation with a differential case 12, a plurality of pinions 14 and the pair of side gears 16 respectively disposed in the differential case.

A differential controlling device according to the present invention controls the differential of the differential gear 10 and, as shown in FIG. 1, comprises means 24 for operating the limiting means 22, a sensor 26 for detecting a braking condition of a vehicle, a sensor 28 for detecting a steering angle and a controller 30.

The differential gear 10 comprises the differential case 12, a plurality of pinions 14 (two pinions are shown in the drawing) supported rotatably around a pinion shaft 32 fixed to the differential case 12 and two side gears 16 disposed in the differential case 12 to mesh with the pinions 14.

The differential case 12 is supported rotatably by a differential carrier 36 through a pair of roller bearings 34 (one bearing is shown in the drawing). A ring gear 38 is attached to the differential case 12. The ring gear 38 meshes with a drive gear 40 to receive drive force therefrom. The shaft 18 is spline connected with one side gear 16 and the shaft 20 with the other side gear 16.

The limiting means 22 in the embodiment shown is a lock mechanism provided in relation with the shaft 20. The means 22 has a sleeve 42 spline connected with the shaft 20 and mounted thereon movably in its axial direction, but relatively unrotatably to the shaft 20. A plurality of claws 43 are provided circumferentially on the sleeve 42 at equal intervals to project toward the differential case 12. On the other hand, a plurality of recesses 13 capable of engaging the claws 43 are provided circumferentially on the differential case 12 at equal intervals. Therefore, the differential case 12 and shaft 20 cannot be rotated relative to each other to limit the rotational speed differential between the shafts 18,20 when the claws 43 fit into the recesses 13 respectively.

The operating means 24 includes a tube 44, a piston 46 disposed movably in the tube 44 under sealed condition, a piston rod 48 connected with the piston 46 and an operating rod 50 connected with the piston rod 48 and extending to the sleeve 42 of the limiting means 22. The operating rod 50 has a fork 51 which engages an annular groove provided on an outer periphery of the sleeve 42. Thus, the sleeve 42 may be shifted axially of the shaft 20 by the operating rod 50 and rotated relative to the operating rod 50.

A coil spring 52 for biasing the piston 46 away from the differential case 12 is disposed in the tube 44 to constitute a single acting type cylinder device. When fluid pressure is introduced into a chamber 54, which is defined by the piston 46 in the tube 44, the piston 46 shifts against spring force of the spring 52, so that the claws 43 of the sleeve 42 engage the recesses 13 of the differential case 12. When the fluid pressure is released, the piston 46 is pushed out by the action of the coil spring 52.

The controller 30 is a CPU or a computer for receiving signals of the sensor 26, such as a pressure switch for detecting brake pressure, for judging the presence of braking and the sensor 28 for detecting the size of a steering angle. The controller 30 judges as will be later described to operate the operating means 24.

The operating means 24 in the embodiment shown is actuated by a hydraulic unit 60 which includes a pump 62, a relief valve 64, a check valve 66, an accumulator 68 and a reservoir tank 72 to maintain constitutionally oil pressure at a predetermined value. The hydraulic unit 60 communicates to the chamber 54 of the operating means 24 through a direction controlling valve 70.

Figure 2:
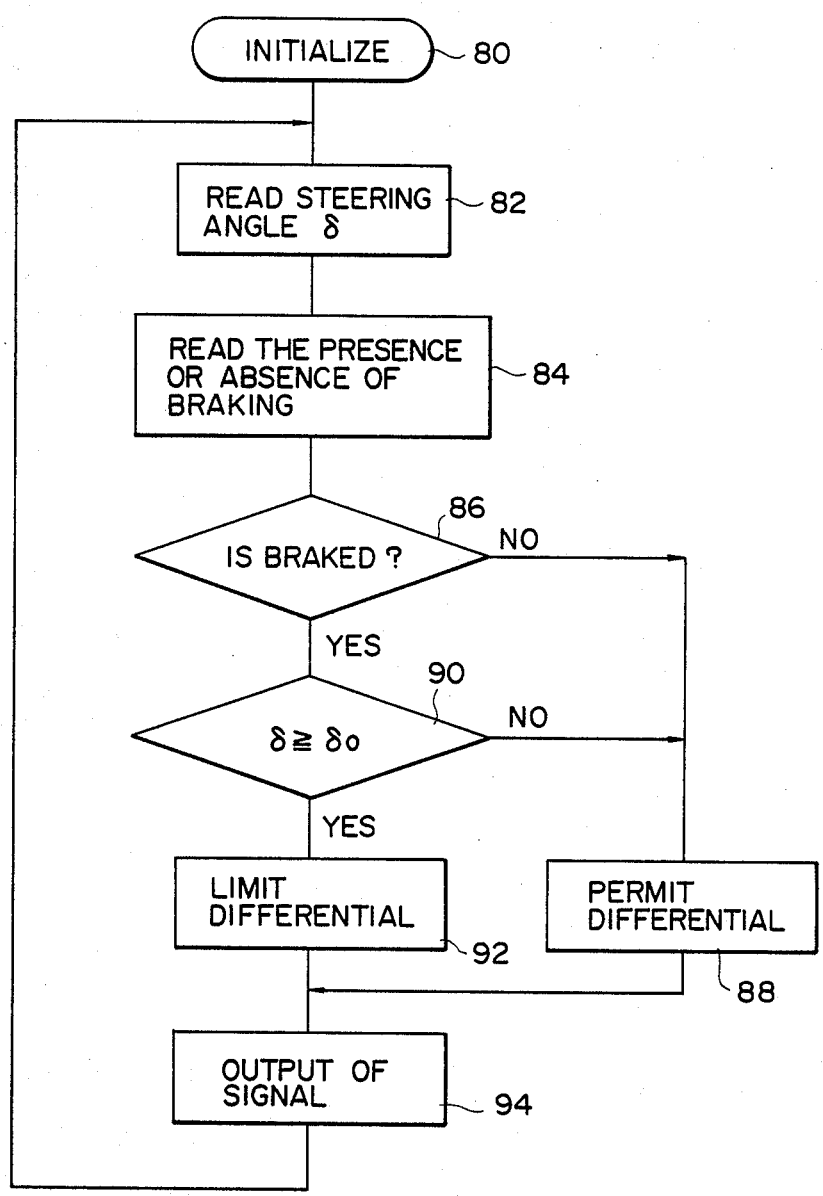
FIG. 2 is a flow chart showing a flow of control.

In operation, the controller 30, as shown in FIG. 2, is initialized (80), reads (82) the size $\delta$ of a steering angle from the sensor 28 and then reads (84) the presence of braking from the sensor 26. The controller 30 judges (86) as to whether the braking is present and sets (88) the differential gear 10 to the condition to permit the rotational speed differential generated from the when the wheels are not braked. On the other hand, when the wheels are braked; the controller 30 further judges (90) as to whether the steering angle $\delta$ exceeds a set value $\delta_0$ and then sets (88) the differential gear 10 to the condition to permit the speed differential and to generate (94) a signal when the steering angle $\delta$ does not exceed the set value. Thus a portion 71a of the direction controlling valve 70 operates to allow the speed differential of the differential gear 10.

When the wheels are braked and the steering angle $\delta$ is not less than the set value $\delta_0$ determined experimentally or empirically, the controller 30 sets (92) the differential gear 10 to the condition to limit the speed differential to generate (94) a signal. As a result, a portion 71b of the direction controlling valve 70 operates. Then, the oil pressure is introduced into the chamber 54 of operating means 24 to permit the piston 46 to shift against the coil spring 52, thereby shifting the sleeve 42. When the claws 43 are fitted in recesses 13 of the differential case 12 due to the shift of the sleeve 42, the speed of the differential gear 10 is limited. At the same time, the limitation of the differential motion is displayed on a display board 74 (FIG. 1) in a compartment.

After the completion of turning, the controller 30 generates (94) a differential change-over signal to change over the direction controlling valve 70. Thus, the oil pressure in the chamber 54 of the operating means 24 is released to the reservoir 72. As a result, the piston 46 is pushed out by the coil spring 52 to disengage the sleeve 42 from the differential case 12.

What is claimed is:

1. A differential controlling device for controlling a rotational speed differential generated to shafts respectively connected to a pair of side gears in cooperation with a differential case, a plurality of pinions and the pair of side gears respectively disposed in said differential case, in a differential gear capable of being limited with limiting means, comprising:
   means for operating said limiting means;
   a sensor for detecting a braking condition of a vehicle;
   a sensor for detecting the steering angle; and
   a controller for receiving signals from both sensors and controlling said operating means to limit the rotational speed differential generated from said differential speed differential generated from said differential gear when the vehicle is braked and turned with a steering angle exceeding a predetermined value.

2. A differential controlling device as claimed in claim 1, wherein said operating means is a single acting type cylinder device.

3. A differential controlling device as claimed in claim 1, wherein said operating means is connected to a constant-pressure hydraulic unit.

4. A differential controlling device as claimed in claim 1, further comprising a display board for displaying the condition that the rotational speed differential of said differential gear is limited.

5. A differential controlling device as claimed in claim 1, wherein said differential case has a plurality of recesses provided circumferentially at equal intervals and said limiting means comprises a sleeve having a plurality of claws at positions facing to said recesses and supported by one shaft shiftably in an axial direction thereof and unrotatably relative thereto.

6. A differential controlling device as claimed in claim 5, wherein said operating means comprises an operating rod having a fork engaging said sleeve shiftably and relatively rotatably.

7. A differential controlling device as claimed in claim 6, wherein said operating means is a single acting type cylinder device.

* * * * *